United States Patent [19]

Popp et al.

[11] Patent Number: 5,016,422
[45] Date of Patent: May 21, 1991

[54] APPARATUS FOR SCREW-COUPLING TWO HEAVY WEIGHT COMPONENTS HAVING A COMMON VERTICAL AXIS

[75] Inventors: Franz-Wolfgang Popp, Wedemark; Erwin Krammer, Edemissen/Abbensen; Wolfgang Genannt; Dietmar Flehr, both of Celle, all of Fed. Rep. of Germany

[73] Assignee: Deutsche Gesellschaft fur Wiederaufarbeitung Von Kernbrennstoffen mbH, Hanover, Fed. Rep. of Germany

[21] Appl. No.: 307,936

[22] Filed: Feb. 9, 1989

[30] Foreign Application Priority Data

Feb. 11, 1988 [DE] Fed. Rep. of Germany ....... 3804276

[51] Int. Cl.$^5$ .................. B67B 1/06; B65B 7/28; B23P 19/04
[52] U.S. Cl. .................. 53/330; 53/331.5; 53/367; 29/240; 29/468; 81/57.14
[58] Field of Search ............ 53/317, 318, 323, 331.5, 53/367, 368, 489, 490, 330; 29/468, 723, 240; 279/8, 99; 81/57.16, 57.14, 57.19

[56] References Cited

U.S. PATENT DOCUMENTS

| | | | |
|---|---|---|---|
| 2,162,445 | 6/1939 | Richel | 53/317 X |
| 2,471,407 | 5/1949 | Budig | 279/8 X |
| 3,696,495 | 10/1972 | Synstad et al. | 29/240 |
| 4,492,134 | 1/1985 | Reinholdt et al. | 81/57.16 X |
| 4,497,155 | 2/1985 | Grosskreuz et al. | 53/331.5 |
| 4,675,967 | 6/1987 | Okada | 29/240 |
| 4,676,712 | 6/1987 | Hayward et al. | 29/240 X |
| 4,729,158 | 3/1988 | Williams | 29/240 X |

*Primary Examiner*—Horace M. Culver
*Attorney, Agent, or Firm*—Cushman, Darby & Cushman

[57] ABSTRACT

Apparatus to screw heavy lids very sensitively on thick-walled receptacles in order to avoid damaging the threads includes a stationary member centered on the receptacle and of an axially movable platform which is guided such that torques can be transmitted and the common axis always remains the same. Resilient members of adjustable length transmit mass forces in vertical direction exactly on the stationary member and prevent additional forces from acting on the flanks of the threads.

8 Claims, 1 Drawing Sheet

APPARATUS FOR SCREW-COUPLING TWO HEAVY WEIGHT COMPONENTS HAVING A COMMON VERTICAL AXIS

Specification

An apparatus for screw-coupling two heavy weight components having a common vertical axis, especially for screwing a lid on a receptacle for transportation and/or storage of radioactive material.

FIELD OF THE INVENTION

This invention relates to apparatus for screw-coupling two heavy weight components having a common vertical axis. More particularly, this apparatus can be used for screwing a lid on a receptacle for transportation and/or storage of radioactive materials.

BACKGROUND OF THE INVENTION

Thick-walled containers having an inner diameter of more than a meter usually are closed by a cover and bolts arranged in a circle. However, it is convenient to provide a thread between the cover and the container for more uniform transmission of forces as known, for instance, with the double receptacle for the transportation and storage of radioactive substances according to German patent 36 20 737. As the lid is very heavy in correspondence with the thickness of the walls of the receptacle (it may weigh as much as several hundred kilograms) and as the thread has a very large diameter (about one meter or more) the screw-coupling must be carried out very sensitively. That makes it necessary to guide the lid centrally in the thread and to avoid tilting at all events. Furthermore, the first contacting between the flanks of the threads must be shockless. During the threading operation, finally, the lid must not be allowed to lie on the flanks of the threads with its own full weight since its high weight and the friction caused by it would damage the thread. These difficulties generally occur wherever one component of very great weight and provided with a thread is to be screwed into another component.

Up to now heavy lids or covers were simply held and guided by a crane. Therefore, the problems described above were not solved by any means.

SUMMARY OF THE INVENTION

In order to overcome the above-mentioned difficulties, the present invention provides apparatus of the kind specified initially by means of which the two components can be screw-coupled perfectly in spite of their heavy weight, without running the risk of damaging the threads. The apparatus is capable of keeping one component at an adjustable spacing from the other component, rotating one component with respect to the other, and keeping forces acting in axial direction between the two components below a predetermined value.

The basic concept of the invention resides in that one component (the lid) is held centered with respect to the other component (the receptacle) by members which are adjustable in length and resilient. These members of adjustable length allow a very sensitive lowering movement, taking place in correspondence with the pitch of the thread and the screwing rate, and no inadmissibly great forces (pressure or friction) occur between the flanks of the threads.

This apparatus essentially consists of two basic elements, namely a stationary member which is fixed against rotation on the one component (receptacle) and centered on the same, and a platform which is coupled to the stationary member and carries out the "advance" occurring upon threading. As already mentioned, the stationary member is self-centered on the receptacle and consequently also centrally with respect to the thread. The torque produced during the threading can be transmitted advantageously by arms extending in downward direction and by carrier pins mounted on the receptacle. The platform substantially moves only axially with respect to the stationary member. The platform which carries the heavy lid, while it is being screwed on is supported in vertical direction by the members of adjustable length. Torque support of the platform and centering of the platform with respect to the stationary member may be effected by way of rolls, preferably however by link rods which are connected hingedly at their respective ends to the stationary member, on the one hand, and to the platform, on the other hand. Preferably, three such link rods offset by 120° each with respect to one another are used to provide stable support. These link rods thus can transmit the torque between the platform and the stationary member and, at the same time, always ensure perfect centering of the platform with respect to the stationary member. The platform is moved in vertical direction by the members of adjustable length which preferably are embodied by compressed air cylinders or, to further reduce friction, by gas spring bellows. The weight of the lid, platform, and further component parts suspended from the same can be compensated by controlling the pressure in the gas spring bellows. Minor variation of this "compensating pressure" can lower or lift the lid very sensitively. If the pressure is regulated within a narrow range of threshold values about the compensation pressure, the forces acting on the flanks of the threads can be kept very small within close limits. For instance, if the lid is screwed in at a faster rate than in agreement with the instantaneous rate of lowering, in correspondence with the pitch of the thread, forces are generated between the flanks of the threads and those forces directly cause a rise in pressure of the gas spring bellows.

Lowering of the pressure in this event may eliminate this "fault" rapidly and very sensitively. In this manner it may be achieved that no forces caused by the weight of the lid act on the flanks of the threads during the screwing, if the pressure is controlled accordingly.

The lid itself is held for rotation with respect to the platform by a mount. This mount is coupled to the platform by a ball race which is suitable for carrying the heavy weight of the lid. The rotational drive is effected continuously in both directions by an infinitely variable electric motor and a ring gear coupling, as is known in the construction of cranes.

The points of attack of the forces between the members of adjustable length and the platform lie above the overall center of gravity of the lid and the platform so that the position of the platform always is centered automatically.

This apparatus is suitable for the fully automatic screwcoupling even of extremely heavy lids. As mentioned above, a preferred field of application of the invention is the screw-coupling between covers and containers for the transportation and storage of radioactive substances. Of course, the invention is suitable also for screw-coupling heavy pipes and is useful, in general, wherever a heavy and often also bulky component is to be screwed on or into another component.

BRIEF DESCRIPTION OF THE DRAWINGS

The invention will be described further, by way of example, with reference to the accompanying drawings, in which.

DETAILED DESCRIPTION OF THE PRESENTLY PREFERRED EXEMPLARY EMBODIMENT

Figure 1:
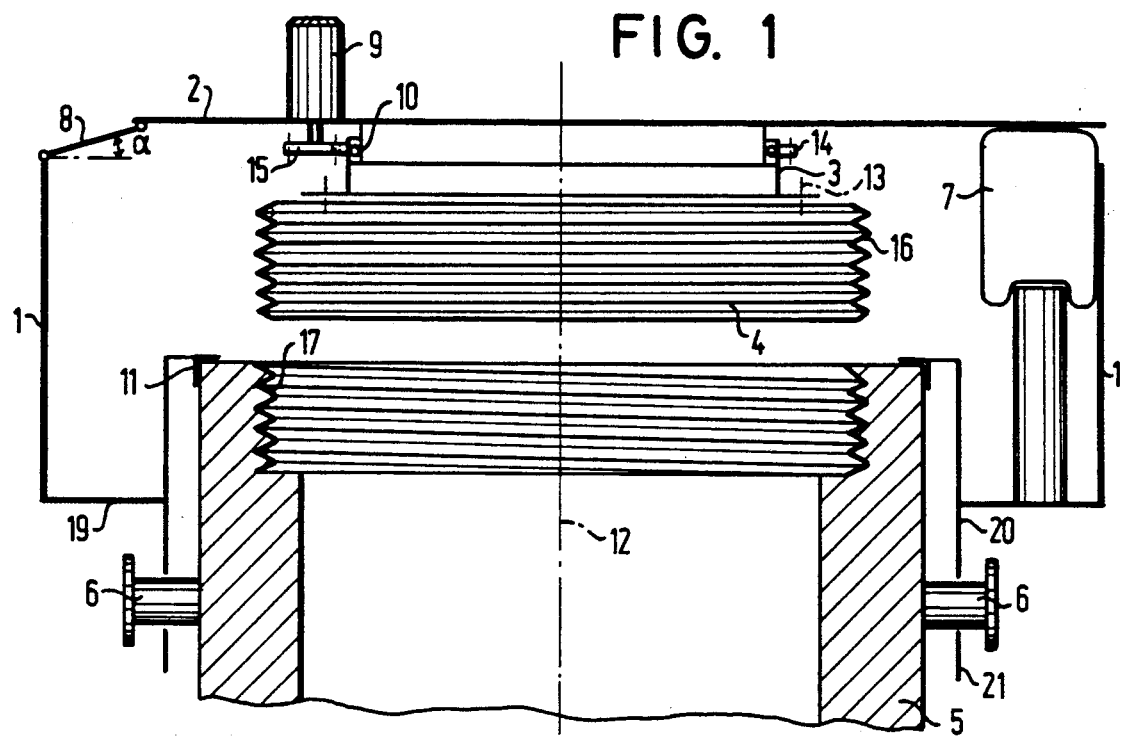
FIG. 1 is a diagrammatic sectional elevation of the apparatus in use.

The embodiment shown in FIG. 1 relates to the screwing of a disc-shaped lid 4 into the end face of a cylindrical receptacle 5. The apparatus according to the invention comprises a member 1 which is stationary with respect to the receptacle 5, centered precisely with respect to the axis 12 of the receptacle, and secured against rotation at the receptacle 5 so that this rotationally fixed connection can transmit the torques needed to screw in the lid. The stationary member 1 is substantially cylindrical, the diagrammatic sketch of FIG. 1 showing the lower edge of the cylinder firmly connected to a disc-shaped member 19 the inner edge of which is connected to a coupling member 20 which again is cylindrical and arranged coaxially with the axis 12. This coupling member 20 has a centering means 11 at its upper end, the centering means resting on the upper, radially outer edge of the receptacle and centering the entire apparatus with respect to the receptacle.

Claws 21 arranged at the lower end of the coupling member 20 clasp radially projecting carrier pins 6 of the receptacle and thus ensure that the apparatus cannot be rotated with respect to the receptacle about the axis 12. This provides the guarantee that indeed the torques are transmitted which are needed for threading.

A platform 2 which is movable in the direction of the axis 12 is provided in the area of the upper end of the stationary member 1. This platform, too, is centered precisely with respect to the axis 12, i.e. a vertical line on its center coincides perfectly with the axis 12. Yet the platform is movable with respect to the stationary member 1 in the direction of the axis 12. A mount 3 is attached to the platform and carries the lid 4 to be screwed in. The lid may be attached to the mount, for instance, by threaded bolts 13. The mount 3 is retained on the platform by a bearing plate 10 whose axis of rotation coincides precisely with the axis 12 of the receptacle. It should be mentioned on the side that the bearing plate is designed so as to be able to take up the full weight of the lid 4 in axial direction. In the area of the bearing plate the mount 3 includes a ring gear 14 which cooperates with a pinion 15 of a stepless rotary drive means 9 which is rigidly fixed to the platform 2. This structure thus permits the mount 3, including the lid 4, to be rotated with respect to the platform 2.

The axial movability between member 1 of the apparatus and platform 2 is obtained by members of adjustable length. In the embodiment shown, these members are gas spring bellows 7. Three gas spring bellows, arranged offset with respect to one another by 120° each are used in this embodiment. The platform 2 thus may be lowered or raised with respect to the stationary member 1 by increasing or decreasing the pressure of the gas spring bellows 7.

Figure 2:
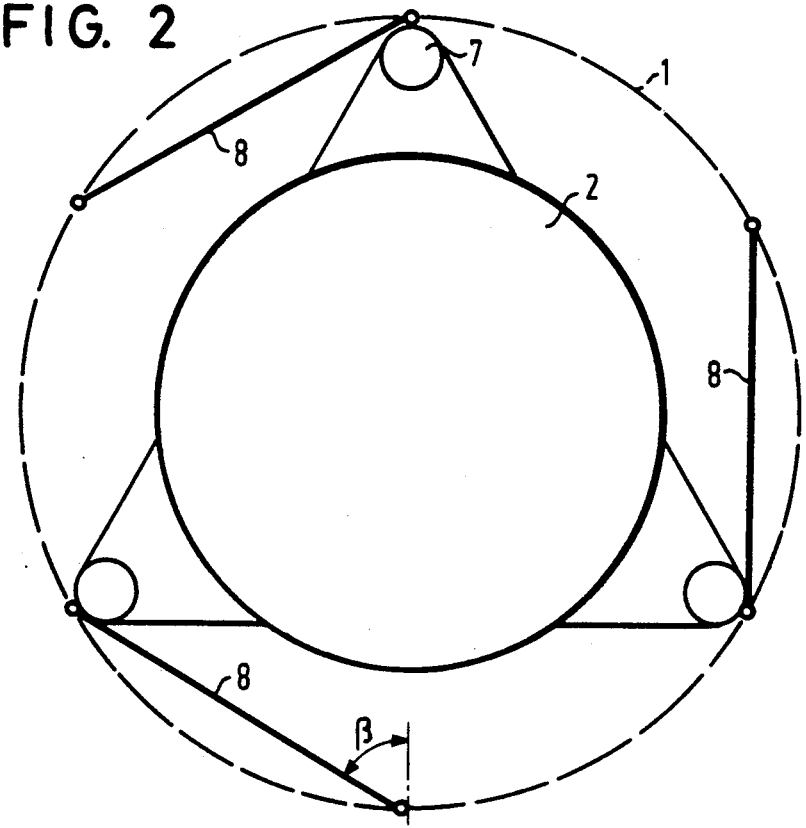
FIG. 2 is a top plan view of the apparatus, specifically illustrating the arrangement of the link rods.

The platform 2 is coupled to the member 1 by several link rods 8 which, on the one hand, serve to center the platform 2 always with respect to the axis 12 and, on the other hand, give it the necessary torque support for the screw-coupling. One end each of these link rods is connected to the stationary member and the other end to the platform, by a low-friction universal joint each. As shown in FIG. 2, there are three link rods arranged at uniform spacings along the circumference, i.e. offset by 120°, of the platform 2 and of stationary member 1.

The link rods 8 extend at an angle $\alpha$ with respect to the horizontal, as may be seen in FIG. 1. This angle is variable in response to the extension or retraction of the platform. As the link rods 8 are rigid themselves, axial displacement of the platform without any change in length of the link rods 8 is possible only if the link rods also change their angle $\beta$ (in the top plan view of FIG. 2) between their fixing point at member 1 and a line which extends from that point to the center (axis 12). This means that the platform 2 rotates to a certain degree while being displaced.

In principle, of course, it would be possible as well to effect the centering and axial guidance of the platform 2 with respect to the stationary member 1 by means of rolls, as briefly mentioned above in the introduction to the specification, and to have the rolls run in guide paths extending at the inner side of member 1 in parallel with the axis 12. Regardless of the specific structural design of the coupling between the platform 2 and the stationary member 1, care must be taken that the following two conditions always are fulfilled: the platform 2 always must be centerways with respect to apparatus member 1, and the torque support between the platform 2 and apparatus member 1 must be guaranteed. Centering in this context is meant to express the fact that the axis of rotation of the bearing plate 10 is precisely aligned with the axis 12, i.e. that there is no offsetting of centers nor any tilt angle. (Of course, the receptacle 5 also must be in upright position.)

For screw-coupling and uncoupling of the lid 4, the pressure in the gas spring bellows 7 first is adjusted to a basic value which just compensates the weight of the lid 4 and platform 2 with the component parts suspended from the same. Thereupon the platform 2 can be lowered very slowly and sensitively by slightly reducing the pressure until the lower flank of the external thread 16 of the lid 4 makes its first contact with the upper flank of the internal thread 17 of the receptacle 5. This contact is reflected immediately by a change in pressure because the flanks of the threads now are taking up forces and the gas spring bellows are somewhat relieved thereby. By limiting the value of the differential pressure by which the pressure in the gas spring bellows 7 is allowed to deviate from the stationary reference pressure, also the loading of the flanks of the threads thus may be limited in very simple manner. Now, if the continuous rotary drive means 9 is set into motion, starting from this position, the lid will twist into the receptacle. The pitch of the thread will cause further lowering and, at the beginning, that will cause a pressure increase in the gas spring bellows 7 since the flanks of the threads once more are relieved. The pressure even rises above the stationary reference pressure because, with the further threading, (without simultaneous lowering) the upwardly directed flanks of the thread on the lid engage the downwardly directed flanks of the threads on the receptacle. If this upper pressure value is limited, too, and the pressure in the gas spring bellows 7 is lowered again when this upper pressure value is reached, a simple two-point pressure control makes it possible to keep the forces acting on the thread in axial direction within predetermined limit values. That is achieved irrespective of the rotational speed of the rotary drive means 9, by merely controlling the pressure. Fundamentally, the pressure in the individual gas spring bellows 7 could be controlled separately. But it is simpler to interconnect the pressure supply lines to the gas spring bellows and pass them to a single control valve. That guarantees prevailance of the same pressure in all the given gas spring bellows whereby any tilting or canting is practically excluded.

If the members of adjustable length are embodied by gas pressurized spring bellows or cylinders, the compressibility of the fluid, of necessity, also affords spring properties which are required for perfect working of the apparatus. These spring characteristics, of course, can be realized in different manner, too, such as when using hydraulic cylinders, by connecting spring-elastic elements in the hydraulic circuit. Moreover, theoretically the piston arrangements can be replaced by electric motors with spindle drives which then are coupled to one of members 1 and 2 of the apparatus by springy elements.

What is claimed is:

1. An apparatus for screw-coupling two heavy weight components having a common vertical axis, comprising:
    resilient, adjustable length means for keeping the components at an adjustable spacing from each other;
    a rotary drive means for relatively rotating the components;
    wherein the resilient means is also for maintaining forces, acting in an axial direction along the vertical axis between the components, below a threshold value;
    a stationary member which is centered and fixed against rotation on one of the components;
    a platform which is displaceable along the vertical axis and which supports at least the other of the components during the threading operation such that it can be rotated with respect to the platform about the vertical axis, the platform being supported in a vertical direction with respect to the stationary member by the resilient means; and
    support means coupling the platform and the stationary member for guaranteeing torque support, permitting vertical movement, and ensuring centering between the platform and the stationary member, wherein the support means includes a plurality of link rods each of which is hingedly connected to the platform and the stationary member along the circumference of the stationary member.

2. Apparatus as in claim 1 wherein the adjustable length means are gas adjustment cylinders.

3. Apparatus as in claim 1 wherein the adjustable length means are gas spring bellows.

4. Apparatus as in claim 2 or 3, wherein the adjustable length means each include a pressurized gas with a pressure controlled between upper and lower threshold values to a constant pressure which is required for the stationary holding of the platform and the component which is fastened to the same.

5. Apparatus as in claim 1, wherein a common center of gravity of the platform and the component to be screwed on is located in a vertical direction below the points of support of the adjustable length means.

6. Apparatus as in claim 1, wherein the rotary drive means is infinitely variable.

7. Apparatus as in claim 1 further comprising a bearing plate connecting the platform to a rotatable mount to which the component to be screwed on is fixed, the rotary drive means rotating the mount with respect to the platform.

8. Apparatus as in claim 1, further comprising a suspension point for moving the apparatus as a whole and a centering means for automatically coupling to the respective component and for self-centering the component.

* * * * *

UNITED STATES PATENT AND TRADEMARK OFFICE
CERTIFICATE OF CORRECTION

PATENT NO. : 5,016,422
DATED : May 21, 1991
INVENTOR(S) : POPP et al.

It is certified that error appears in the above-identified patent and that said Letters Patent is hereby corrected as shown below:

THE TITLE PAGE:

READS:
    [73] Assignee: Deutsche Gesellschaft fur Wiederaufarbeitung Von Kernbrennstoffen mbH, Hanover, Fed. Rep. of Germany SHOULD READ:
    [73] Assignee: Brennelementlager Gorleben GmbH
    Luchower Str. 8
    3131 Gorleben,
    Fed. Rep. of Germany Signed and Sealed this Seventeenth Day of November, 1992

*Attest:*

DOUGLAS B. COMER

*Attesting Officer*      *Acting Commissioner of Patents and Trademarks*